July 14, 1953      F. S. SCHAADT      2,645,313
HYDRAULIC EMERGENCY BRAKE FOR PNEUMATIC BRAKE SYSTEMS
Filed Nov. 25, 1950      2 Sheets-Sheet 1

INVENTOR.
FRANCIS S. SCHAADT
BY
ATTORNEY

July 14, 1953 — F. S. SCHAADT — 2,645,313
HYDRAULIC EMERGENCY BRAKE FOR PNEUMATIC BRAKE SYSTEMS
Filed Nov. 25, 1950 — 2 Sheets-Sheet 2
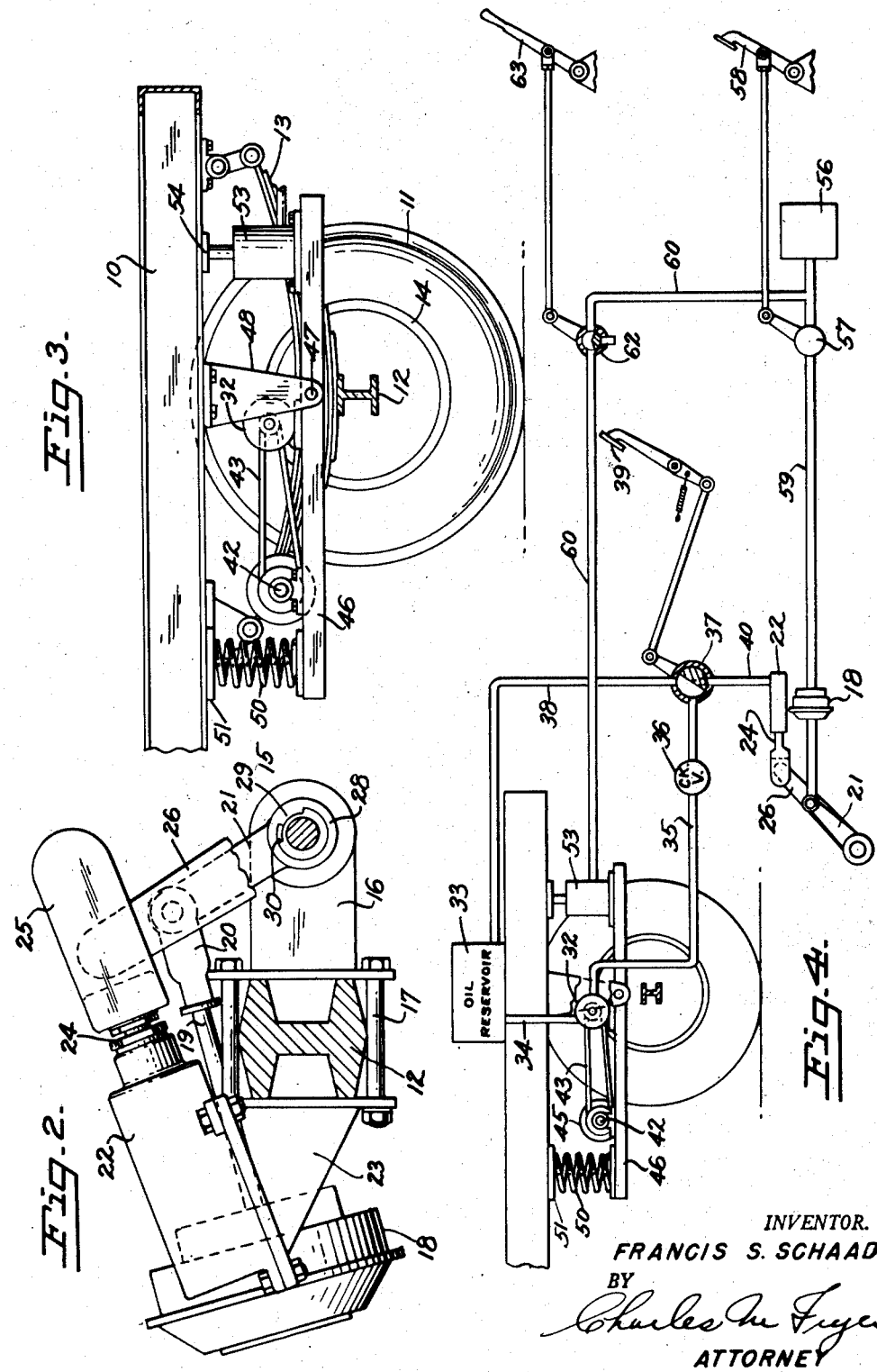
INVENTOR.
FRANCIS S. SCHAADT
BY
ATTORNEY Patented July 14, 1953

2,645,313

UNITED STATES PATENT OFFICE 2,645,313

HYDRAULIC EMERGENCY BRAKE FOR PNEUMATIC BRAKE SYSTEMS

Francis S. Schaadt, San Francisco, Calif.

Application November 25, 1950, Serial No. 197,591

2 Claims. (Cl. 188—152)

The present invention relates to vehicle brakes and particularly to a hydraulic brake system to be used as an auxiliary or emergency brake on vehicles such as large trucks, trailers and busses which employ pneumatic brakes.

Many large vehicles have pneumatic brake systems but only a mechanical emergency brake that is inadequate for emergency purposes when the vehicle is under way at high speed or carrying a heavy load. Furthermore, the mechanical emergency brake is carried only by the powered vehicle so that where trailers or semi-trailers are used, the pneumatic system is relied upon entirely in the trailer unit. Pneumatic systems are subject to failure because of bursting or leakage of the many necessary conduits through which pressure is transmitted and many accidents result from these failures.

It is an object of the present invention to provide a hydraulic brake system for use in conjunction with a pneumatic brake system and to provide a hydraulic system normally held out of operation but automatically brought into operation upon failure of pressure in the pneumatic system.

Another object of the invention is to provide a hydraulic brake for vehicles or the like in which power to supply hydraulic pressure is obtained directly from the inertia of the moving vehicle.

Still further and more specific objects and advantages of the invention are made apparent in the following description wherein reference is made to the accompanying drawings illustrating a typical form which the invention may assume.

In the drawings:

Fig. 2 is an enlarged sectional view taken on the line II—II of Fig. 1;

Fig. 3 is a sectional view taken on the line III—III of Fig. 1; and

Fig. 4 is a schematic view illustrating hydraulic and pneumatic circuits.

Figure 1:
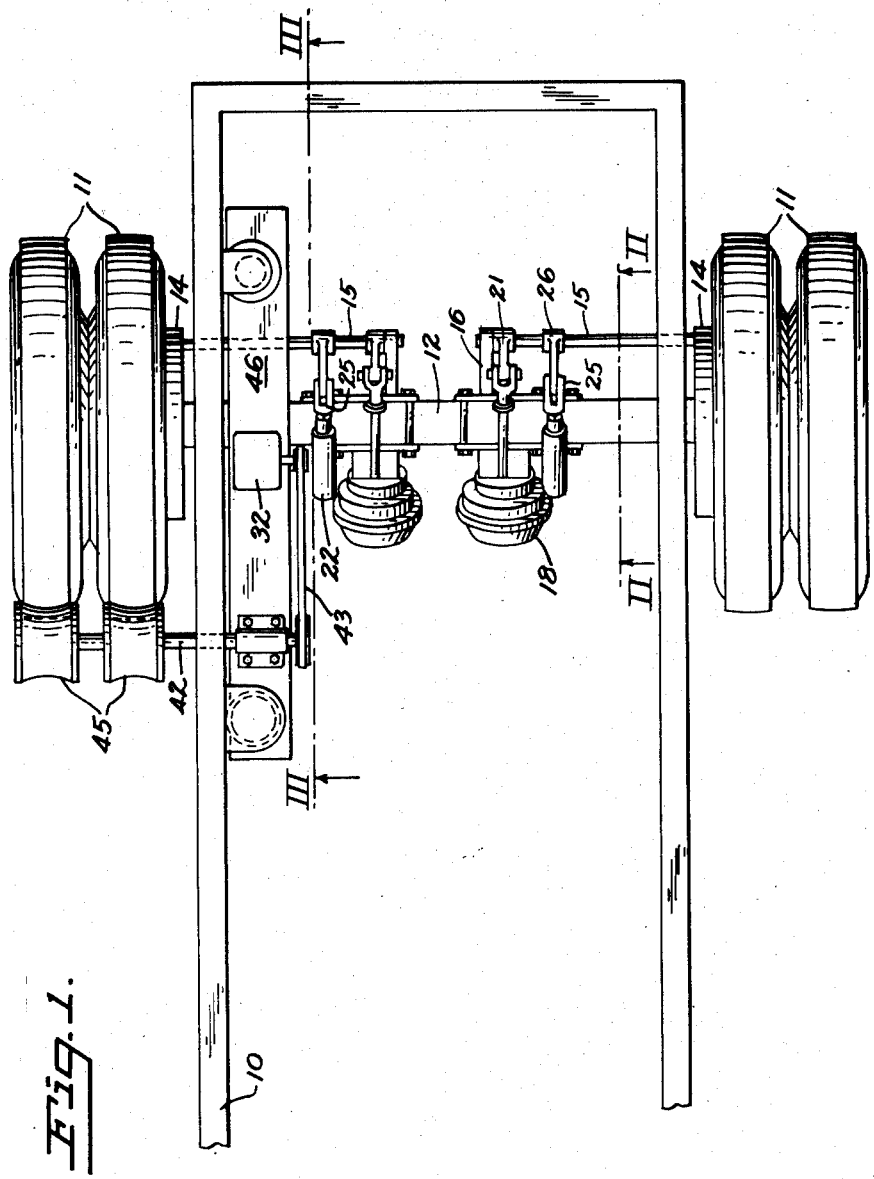
Fig. 1 is a plan view of the rear portion of a truck or trailer chassis equipped with conventional pneumatic brakes and with hydraulic emergency brakes embodying the present invention.

Referring first to Fig. 1 of the drawings, the frame of a trailer chassis is shown at 10 as supported by sets of rear wheels 11 carried by an axle 12, there being the usual spring assembly indicated at 13 in Fig. 3 interposed between the frame and axle. The wheels 11 are provided with brake drums shown at 14 within which the usual brake shoes are provided. The brake shoes are not herein illustrated as they form no part of the present invention and it will suffice to an understanding of this invention to know that the brakes used are spread apart or urged into contact with the drum for braking action by rotary or oscillatory movement of a shaft 15 which is supported for rotation as in a bearing bracket 16 clamped to the axle, as best shown in Fig. 2, by means of bolts indicated at 17.

Each of the shafts 15 is adapted to be rotated or oscillated to effect application of the brakes by means of a pneumatic cylinder 18 with a piston rod 19 adapted to be projected when pneumatic pressure is supplied to the cylinder. The end of the rod 19 is connected as by a clevis 20 with a lever 21 fixed to the shaft 15. All of the foregoing structure is conventional and is subject to the objection heretofore mentioned that failure of pneumatic pressure leaves the vehicle entirely without braking power.

According to the present invention, a hydraulic ram or jack, such as indicated at 22, is also applied to oscillate each of the shafts 15 and apply the brakes. Each of the jacks 22 is supported by a bracket 23, see Fig. 2, secured to the axle 12, if desired, by clamping means similar to that which carries the bearing bracket 16. Each of the hydraulic jacks 22 has an extendable piston rod 24 with a bifurcated fitting 25 at its outer end. This fitting 25 embraces a lever 26 fixed to the shaft 15 so that upon extention of the piston rod 24 when hydraulic pressure is introduced to the jack, the shaft 15 will be oscillated to apply the brakes. However, when the hydraulic system is not in use, oscillation of the shaft 15 by the pneumatic system will be accompanied by swinging movement of the lever 26 without effecting the hydraulic jacks 22 because the lever is free to move in the bifurcated fitting 25. It is also desirable that the hydraulic system be enabled to oscillate the shaft 15 without effecting the pneumatic cylinders and to obtain this result, the lever 21 actuated by the pneumatic brake system may be connected to the shaft 15, as shown in Fig. 2, through a collar 28 fixed to the shaft and having an arcuate cut-away portion 29. The hub of the lever 21 has an inwardly projecting segment 30 which fits into but is smaller than the cutaway portion 29 and normally abuts one end of the cut-away portion as illustrated in Fig. 2. With this construction, swinging of the lever 21 toward the right to apply the brakes will rotate the collar 28 and shaft 15. However, upon application of the brakes by the hydraulic system, the shaft and collar are free to oscillate in a right hand direction as viewed in Fig. 2 without moving the lever 21 and therefore without extending the piston rod 19 of the pneumatic cylinder.

Pressure is provided in the hydraulic system by a pump 32, see Figs. 1, 3 and 4, adapted to draw oil from a reservoir 33 through an inlet conduit 34. A discharge conduit 35 communicating with the pump and including a check valve 36 delivers oil through a control valve 37 and thence through a return line 38 to the reservoir. The control valve 37 may be manipulated as by a foot pedal 39 operable from the driver's cab to cut off the return flow and direct the oil under pressure through a conduit 40 which communicates with the hydraulic jack 22 to apply the brakes as previously described. The pump 32 is adapted to be driven from a power shaft 42 through a belt 43 and suitable pulleys or other conventional driving mechanism. The power shaft 42 carries friction rollers shown at 45 in Fig. 1 adapted to be brought into engagement with the tread surface of the tires on the wheels 11. A single roller may be employed to engage one tire but on a dual wheel vehicle, a greater frictional advantage is obtained by the use of two rollers as shown. The pump 32 and the bearings for the shaft 42 are both mounted on a platform 46 pivotally supported as by a pin 47 in brackets 48 which may depend from the frame of the vehicle. A spring 50 is interposed between the pivoted platform 46 and a spring seat 51 is secured to the vehicle frame and normally tends to urge downwardly that end of the platform which supports the shaft 42 and brings the rollers 45 into frictional contact with the vehicle wheels. At the opposite end of the platform a pneumatically actuated jack 53 is interposed between the platform and a pad 54 also secured to the frame of the vehicle so that when the jack is extended by pneumatic pressure, the platform is swung in the opposite direction to compress the spring 50 and hold the rollers 45 out of contact with the wheels of the vehicle.

The hydraulic and pneumatic circuits and the manner in which the emergency brake operates are best illustrated in Fig. 4 of the drawings. In this figure, the pneumatic cylinder 18 which operates the air brakes is shown as supplied with air under pressure from a compresser schematically illustrated at 56. A valve 57 controlled by a foot pedal 58 in the driver's cab controls pneumatic pressure through a conduit 59 for operating the brakes at will. A branch conduit 60 communicates air under pressure to the jack 53 for holding the hydraulic system out of operation as previously described. In the event of failure of the compresser or loss of pressure in the lines 59 and 60 from any cause, the pneumatic pressure in the jack 53 fails and the spring 50 swings the platform 46 downwardly so that the drive shaft 42 is driven by frictional contact of the drums 45 with the wheels 11. Consequently the normally idle hydraulic pump 32 is driven to circulate fluid through the hydraulic system and the brakes may be actuated hydraulically through the foot pedal 39. If for any reason it becomes desirable to employ the hydraulic system for actuating the brakes while pressure remains in the pneumatic system, a valve 62 in the line 60 is operable as by a hand lever 63 in the cab to discontinue the supply of pneumatic pressure to the jack 53 and to vent pressure from the jack. When this has been done, either one or both of the systems may be actuated to apply the brakes.

In the diagrammatic illustration of Fig. 4, mechanical linkages are illustrated between the brake pedals 39 and 58 and the valves controlled by them, as well as between the hand lever 63 and the valve which it controls. Such linkages may be employed satisfactorily where the entire braking system is on a truck without a trailer. For trailer brakes, the mechanical linkage may, of course, be replaced by electromagnetically actuated valves or other devices commonly used for this purpose wherein no rigid mechanical connection is necessary between the truck and the trailer unit.

I claim:

1. An emergency brake for vehicles with a fluid actuated first system which comprises a second fluid system for applying the brakes, said second system comprising a pivoted platform, a fluid pump on the platform, drive means for the pump comprising a roller engageable with a ground engaging wheel of the vehicle to be driven thereby when the vehicle is in motion, resilient means normally pivoting the platform toward such roller engaging position, and a fluid jack opposing said resilient means and supplied with pressure from said first named fluid system whereby upon failure of pressure in said first system the second system will become operable.

2. An emergency brake for vehicles with a fluid actuated first system which comprises a second fluid system for applying the brakes, said second system comprising a pivoted platform, a fluid pump on the platform, drive means for the pump comprising a roller engageable with a ground engaging wheel of the vehicle to be driven thereby when the vehicle is in motion, resilient means normally pivoting the platform toward such roller engaging position, a fluid jack opposing said resilient means and supplied with pressure from said first named fluid system whereby upon failure of pressure in said first system the second system will become operable, and valve means to relieve pressure from said jack without relieving pressure from said first system.

FRANCIS S. SCHAADT.

References Cited in the file of this patent

UNITED STATES PATENTS

| Number | Name | Date |
|---|---|---|
| 857,010 | Beatty | June 18, 1907 |
| 1,196,326 | Becker | Aug. 29, 1916 |
| 1,567,982 | Pfeiffer | Dec. 29, 1925 |
| 2,152,022 | Boetto | Mar. 28, 1939 |
| 2,409,908 | Simpkins | Oct. 22, 1946 |
| 2,493,196 | Hollerith | Jan. 3, 1950 |